(12) United States Patent
Yu et al.

(10) Patent No.: US 11,959,581 B2
(45) Date of Patent: Apr. 16, 2024

(54) QUICK CONNECTION MECHANISM

(71) Applicant: PGYTECH CO., LTD., Jiangsu (CN)

(72) Inventors: Xiuzhi Yu, Jiangsu (CN); Jian Song, Jiangsu (CN)

(73) Assignee: PGYTECH CO., LTD., Jiangsu (CN)

( * ) Notice: Subject to any disclaimer, the term of this patent is extended or adjusted under 35 U.S.C. 154(b) by 0 days.

(21) Appl. No.: 17/630,129

(22) PCT Filed: Jun. 1, 2021

(86) PCT No.: PCT/CN2021/097644
§ 371 (c)(1),
(2) Date: Aug. 4, 2022

(87) PCT Pub. No.: WO2022/160542
PCT Pub. Date: Aug. 4, 2022

(65) Prior Publication Data
US 2023/0366503 A1 Nov. 16, 2023

(30) Foreign Application Priority Data
Jan. 29, 2021 (CN) .......................... 202120267920.5

(51) Int. Cl.
*F16M 11/04* (2006.01)
(52) U.S. Cl.
CPC ....... *F16M 11/041* (2013.01); *F16M 2200/02* (2013.01)
(58) Field of Classification Search
CPC .. F16M 11/00; F16M 11/041; F16M 2200/00; F16M 2200/02
See application file for complete search history.

(56) References Cited

U.S. PATENT DOCUMENTS

| 6,196,504 B1 | 3/2001 | Lemke |
| 6,827,319 B2 * | 12/2004 | Mayr ..................... F16M 13/00 396/428 |
| 7,370,449 B1 * | 5/2008 | Beckmann ............ F41G 11/003 42/106 |

(Continued)

FOREIGN PATENT DOCUMENTS

| CN | 201340508 Y | 11/2009 |
| CN | 101861491 A | 10/2010 |

(Continued)

*Primary Examiner* — Monica E Millner
(74) *Attorney, Agent, or Firm* — IP & T GROUP LLP

(57) ABSTRACT

A quick connection mechanism includes a truncated-cone-shaped quick release plate, a base, and a locking structure. A tapered clamping groove is provided in a larger bottom surface of the quick release plate. A sliding groove is provided in the base, and the quick release plate is clamped in the sliding groove. The locking structure is configured to fix the quick release plate that enters the sliding groove. The locking structure includes a rotating shaft, a locking arm rotatably provided on the rotating shaft, and a first elastic member connected to the locking arm and configured to apply, to the locking arm, a force in a direction for locking the quick release plate. One end of the locking arm abuts against an inner side wall of the clamping groove and is configured to enable locking of the quick release plate in the sliding groove by the abutment.

20 Claims, 9 Drawing Sheets

(56) References Cited

U.S. PATENT DOCUMENTS

| | | | | |
|---|---|---|---|---|
| 7,946,771 B2* | 5/2011 | Boneschanscher | ...... | F16M 13/00 |
| | | | | 396/419 |
| 8,438,965 B2* | 5/2013 | Collin | ............ | F41G 11/003 |
| | | | | 89/125 |
| 8,807,496 B2* | 8/2014 | Kessler | ............ | F16M 11/041 |
| | | | | 396/428 |
| 8,827,219 B2* | 9/2014 | Kessler | ............ | F16M 11/041 |
| | | | | 396/428 |
| 11,268,649 B2* | 3/2022 | Richter | ............ | F16M 13/02 |
| 2014/0093314 A1 | 4/2014 | Kessler et al. | | |

FOREIGN PATENT DOCUMENTS

| | | | |
|---|---|---|---|
| CN | 201765421 U | 3/2011 | |
| CN | 201853044 U | 6/2011 | |
| CN | 205447137 U | 8/2016 | |
| CN | 210219121 U | 3/2020 | |
| CN | 212004834 U | 11/2020 | |
| EP | 1365187 B1 | 3/2007 | |

* cited by examiner

QUICK CONNECTION MECHANISM

CROSS-REFERENCE TO RELATED APPLICATIONS

This application is a national stage application of PCT/CN2021/097644 filed on Jun. 1, 2021, which claims priority to Chinese Patent Application No. 202120267920.5, filed with the Chinese Patent Office on Jan. 29, 2021, entitled "Quick Connection Mechanism", which is incorporated herein by reference in its entirety.

TECHNICAL FIELD

The present disclosure relates to the field of quick-release mounting connectors for photography and, in particular, to a quick connection mechanism.

BACKGROUND ART

Prior quick-release mounting structures for photography are not assembled with sufficient stability and are likely to cause photographic apparatuses to fall from gimbals (support heads) when they are affected by factors such as external collisions.

SUMMARY

The object of the present disclosure includes, for example, providing a quick connection mechanism that can improve the assembling stability of a quick-release mounting structure for photography.

Embodiments of the present disclosure are implemented as follows.

In one or more optional embodiments, the present disclosure provides a quick connection mechanism, which may include a quick release plate, a base, and a locking structure.

The quick release plate may be in the shape of a truncated cone, a clamping groove may be provided at a larger bottom surface of the quick release plate, and the clamping groove may be a tapered groove;

a sliding groove may be provided in the base, and the quick release plate may be clamped in the sliding groove;

the locking structure may be configured to fix the quick release plate that enters the sliding groove;

the locking structure may include a locking arm, a rotating shaft, and a first elastic member;

the locking arm may be rotatably provided on the rotating shaft, and one end of the locking arm abuts against an inner side wall of the clamping groove and is configured to enable locking of the quick release plate in the sliding groove by the abutment; and the first elastic member may be connected to the locking arm, and the first elastic member may be configured to apply, to the locking arm, a force in a direction for locking the quick release plate.

In one or more optional embodiments, the sliding groove provided in the base may be a half-through groove, and the sliding groove allows the quick release plate to enter the sliding groove from one end of the base and slide in a length direction of the sliding groove and to be blocked by the side wall of the sliding groove when sliding to the other end of the sliding groove so as to not able to slide.

In one or more optional embodiments, the base may be provided with a receiving cavity, the locking structure may be provided in the receiving cavity, the rotating shaft may be fixedly provided in the receiving cavity, and the two ends of the rotating shaft may be provided on two opposite side walls of the receiving cavity.

In one or more optional embodiments, the base may be provided with first limiting portions, in front of a direction of sliding into the sliding groove and at two sides of a direction of sliding in the sliding groove.

In one or more optional embodiments, the base may be provided with an unlocking structure, and the unlocking structure may be configured to unlock the locking structure.

In one or more optional embodiments, the unlocking structure may include an unlocking arm.

The unlocking arm may be connected to the locking arm, and the unlocking arm may be configured to drive the locking arm to rotate around the rotating shaft to achieve an unlocking function.

In one or more optional embodiments, the unlocking structure may further include an unlocking slider.

Both the unlocking arm and the unlocking slider may be provided in the receiving cavity, the receiving cavity may be provided with an unlocking hole communicating with the outside, and the unlocking slider is provided corresponding to the unlocking hole.

One end of the unlocking arm remote from the locking arm may abut against an end portion of the unlocking slider.

In one or more optional embodiments, a transmission rod may be provided on the unlocking arm close to the unlocking slider, the transmission rod may be rotatably connected to the unlocking arm, and a side wall of the transmission rod may abut against the end portion of the unlocking slider.

In one or more optional embodiments, the unlocking structure may further include a second elastic member, and the second elastic member may be connected to the unlocking slider and configured to apply, to the unlocking slider, a force in a direction away from the unlocking arm.

In one or more optional embodiments, a second limiting portion may be provided on the unlocking slider, and the second limiting portion may abut against one end of the quick release plate close to a groove bottom of the sliding groove.

In one or more optional embodiments, one end of the second limiting portion close to the quick release plate may be in the shape of a spherical cap smaller than a hemisphere.

In one or more optional embodiments, an abutment surface may be provided at an inner edge of a groove opening of the clamping groove, and an included angle between the abutment surface and a surface of the quick release plate close to one side of the second limiting portion is an acute angle.

In one or more optional embodiments, the acute angle may be from 5° to 15°.

In one or more optional embodiments, the second limiting portion may be detachably connected to the unlocking slider; and/or a height of the second limiting portion protruding from the unlocking slider is adjustable.

In one or more optional embodiments, the detachable connection is snap connection or threaded connection.

In one or more optional embodiments, an unlocking push-button may be slidably provided in the unlocking hole, one end of the unlocking push-button may protrude from the unlocking hole, and the unlocking push-button is fixedly connected to the unlocking slider.

The embodiments of the present disclosure have the following advantageous effects.

After the quick release plate slides into the sliding groove from one end of the sliding groove, the locking arm is made by abutment to rotate on the rotating shaft. When the quick release plate continues to slide in the sliding groove, the locking arm rebounds, under the action of the first elastic member, into the clamping groove of the quick release plate and abuts against the groove wall of the clamping groove, so that the quick release plate cannot slide from the sliding groove in the reverse direction, thereby enabling quick assembling of the quick release plate onto the base and ensuring stability between the quick release plate and the base.

BRIEF DESCRIPTION OF THE DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE NUMERALS

Figure 1:
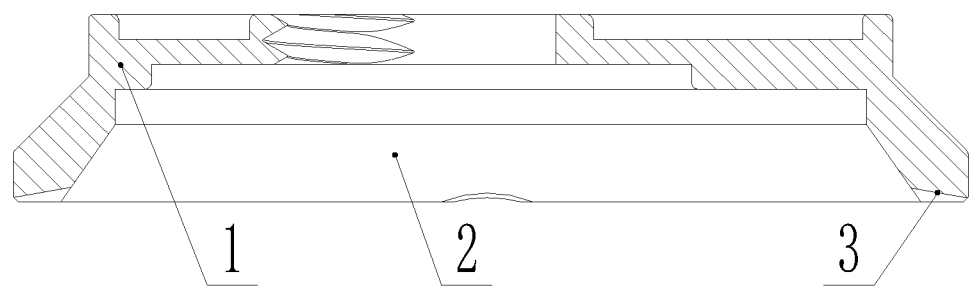
FIG. 1 is a schematic structural diagram of a quick release plate of a quick connection mechanism according to an embodiment of the present disclosure.

1: quick release plate; 2: clamping groove; 3: abutment surface; 4: base; 5: first limiting portion; 6: unlocking slider; 7: second limiting portion; 8: unlocking push-button; 9: receiving cavity; 10: transmission rod; 11: first elastic member; 12: locking arm; 13: unlocking arm; 14: rotating shaft; 15: second elastic member; 16: sliding groove; 17: translational slider; 18: push-button lever; 19: fixing screw; 20: connecting shaft; 21: push-button screw.

DETAILED DESCRIPTION OF THE EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that the terms such as "center", "up", "down", "left", "right", "vertical", "horizontal", "inside", and "outside" indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first", "second", and "third" are used for distinguishing the description only, and should not be understood as an indication or implication of importance in relativity.

In addition, the term "horizontal", "vertical", "overhanging", or the like means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that the terms "arrange", "mount", "couple", and "connect" should be understood in a broad sense unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

Some embodiments of the present disclosure will be described below in detail with reference to FIGS. 1 to 12. The following embodiments and features in the embodiments may be combined with each other in the case of no conflict.

Provided herein is a quick connection mechanism which, as shown in FIGS. 1 to 12, includes a quick release plate 1, a base 4, and a locking structure. The quick release plate 1 is in the shape of a truncated cone, a clamping groove 2 is provided in a larger bottom surface of the quick release plate 1, and the clamping groove 2 is a tapered groove. A sliding groove 16 is provided in the base 4, and the quick release plate 1 is clamped in the sliding groove 16. The locking structure is used to fix the quick release plate 1 that enters the sliding groove 16. The locking structure includes a locking arm 12, a rotating shaft 14, and a first elastic member 11. The locking arm 12 is rotatably provided on the rotating shaft 14, and one end of the locking arm 12 abuts against an inner side wall of the clamping groove 2 and is configured to enable locking of the to quick release plate 1 in the sliding groove 16 by the abutment. The first elastic member 11 is connected to the locking arm 12, and the first elastic member 11 is configured to apply, to the locking arm 12, a force in a direction for locking the quick release plate 1.

In this embodiment, the base 4 may be provided on a gimbal (support head), and the quick release plate 1 is connected to a camera by means of connector(s) such as screw(s), thereby achieving the purpose of quickly fixing the camera to the gimbal.

Specifically, in this embodiment, the base 4 is provided with the sliding groove 16 which is a half-through groove. In other words, the quick release plate 1 is allowed to enter the sliding groove 16 from one end of the base 4 and slide in the length direction of the sliding groove 16 and to be blocked, when sliding to the other end of the sliding groove 16, by the side wall of the sliding groove 16, so as to not able to slide.

In this embodiment, the quick release plate 1 includes two portions, namely, a lower clamping portion and an upper connecting portion. Here, the connecting portion is configured to be connected to a camera or other equipment by means of a connector such as a screw, and the clamping portion is configured to be connected to the locking structure provided on the base 4 to enable the locking of the quick release plate 1.

Specifically, in this embodiment, the clamping portion is in the shape of a truncated cone, and the sliding groove 16 is a dovetail groove, so that the clamping portion can be limited in an upward/downward (or vertical) direction in the base 4 by fitting of the sliding groove 16 with the clamping portion.

It should be noted that the upward/downward direction described in this embodiment is the upward/downward direction shown in the figures and is independent of an upward/downward direction in a state of use of the quick connection mechanism.

Figure 4:
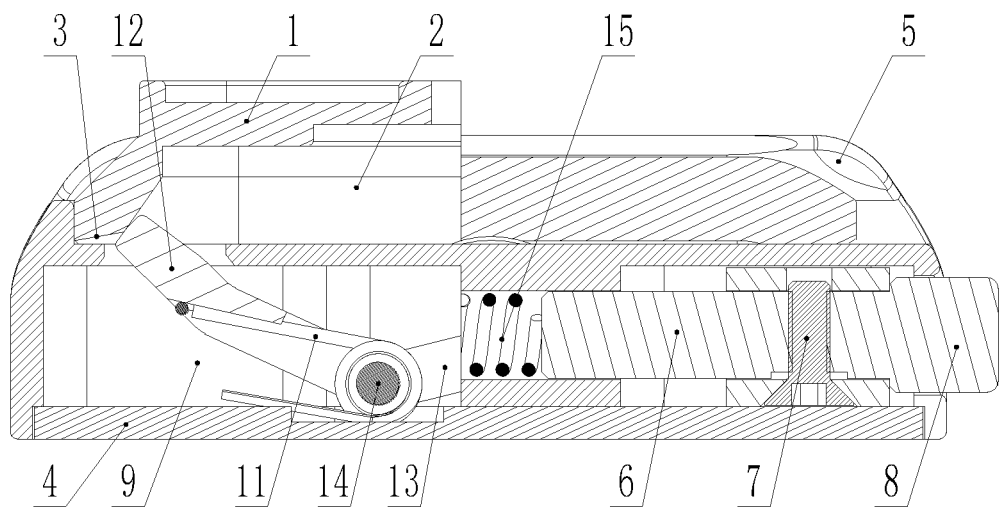
FIG. 4 is a sectional view of the quick connection mechanism according to the embodiment of the present disclosure taken along a direction A-A in FIG. 3.

In this embodiment, as shown in FIG. 4, a receiving cavity 9 is provided in the base 4, and the locking structure is provided in the receiving cavity 9, wherein the rotating shaft 14 is fixedly provided in the receiving cavity 9, and the two ends of the rotating shaft 14 are provided on two opposite side walls of the receiving cavity 9. One end of the locking arm 12 is rotatably provided on the rotating shaft 14, so that the other end of the locking arm can abut against the inner side wall of the clamping groove 2 to enable the fixing of the quick release plate 1.

It should be noted that the locking structure may be provided in the receiving cavity 9 of the base 4 or provided on the lower side of (or below) the base 4. In other words, the base 4 is provided only with a sliding groove 16, the lower side of the sliding groove 16 can communicate with the outside, and the locking structure is communicated with the sliding groove 16 through the lower side of the base 4 to enable the fixing of the quick release plate 1.

In this embodiment, as shown in FIGS. 5 to 8, when the quick release plate 1 enters the sliding groove 16 from the right side of the base 4, the lower end of the left side of the quick release plate 1 abuts against the locking arm 12. When the quick release plate 1 is sliding leftward, a pushing force is applied to the locking arm 12, thus the locking arm 12 is made to rotate counterclockwise, so that the quick release plate 1 can abut against the leftmost end of the sliding groove 16. At this time, the annular end surface at the lower end of the quick release plate 1 crosses the locking arm 12, and the locking arm 12 rotates clockwise under the action of the first elastic member 11, and returns to the initial position. At this time, the end portion of the locking arm 12 abuts against the inner side wall of the clamping groove 2 at the lower part of the quick release plate 1, so that the quick release plate 1 cannot slide rightwards from the sliding groove 16.

The quick release plate 1 is positionally limited in the upward/downward direction by the dovetail groove, and the quick release plate 1 is positionally limited in the leftward/rightward direction by the locking arm 12, thereby ensuring the stability of the quick release plate 1 on the base 4.

Specifically, in this embodiment, the first elastic member 11 is a torsion spring. The torsion spring has one extension end abutting against the bottom of the receiving cavity 9 and the other extension end abutting against the lower side of the locking arm 12, and the torsion spring is sleeved over the rotating shaft 14, as shown in FIGS. 3 to 12.

It can be seen from the above description that in this embodiment, the force applied from the first elastic member 11 to the locking arm 12 is a force for rotating the locking arm 12 clockwise around the rotating shaft 14. In other words, a force in a direction for locking the quick release plate 1 is applied to the locking arm 12.

More specifically, in order to cooperate with the function of the torsion spring, in this embodiment, the locking arm 12 is provided in a U-shape and is connected to the rotating shaft 14 at its end provided with an opening, and the torsion spring is provided inside the U-shaped structure.

In other words, in this embodiment, the locking arm 12 is specifically of a U-shaped plate structure.

It should be noted that in this embodiment, the first elastic member 11 may be a torsion spring, but it is not limited to a torsion spring, and it may be any other elastic device, such as a compression spring, a tension spring, or the like, as long as it can give the locking arm 12 an elastic force to make it clockwise rotate as shown in FIGS. 4 to 12.

It should also be noted that in this embodiment, the force for clockwise rotation applied to the locking arm 12 is an elastic force, but it is not limited to an elastic force, and it may be other power provided by other components. For example, the locking arm may be driven by an air cylinder or oil cylinder, or driven by a magnetic force, or even driven manually or in other manners, as long as the locking arm 12 can always be kept in the locking position in the normal state.

In an optional embodiment, the base 4 is provided with first limiting portions 5, in front of the direction of sliding into the sliding groove 16 and on both sides of the direction of sliding in the sliding groove 16.

Figure 2:
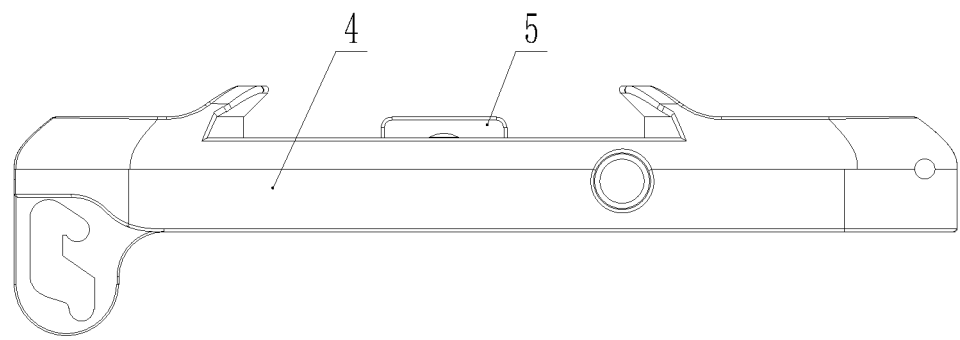
FIG. 2 is a front view of a base of a quick connection mechanism according to an embodiment of the present disclosure.

Specifically, in order to further ensure the stability of the quick release plate 1 on the base 4, first limiting portions 5 are provided on two sides and an end portion of the sliding groove 16, for example, in the leftward/rightward direction shown in FIG. 2 and above the left end of the sliding groove 16 shown in FIGS. 4 to 12.

More specifically, in this embodiment, as shown in FIG. 2, each of the first limiting portions 5 has a certain arc or an angle inclined in a direction toward the interior of the sliding groove 16, so that the quick release plate 1 that has entered the sliding groove 16 can be restricted by the first limiting portions 5 to ensure the stability of the quick release plate 1 in the sliding groove 16.

In an optional embodiment, the base 4 is provided with an unlocking structure, and the unlocking structure is configured to unlock the locking structure.

The quick connection mechanism not only should enable quick locking, but also should enable quick unlocking after the locking, so as to improve the overall use efficiency.

Specifically, in this embodiment, the unlocking structure includes an unlocking arm 13. The unlocking arm 13 is connected to the locking arm 12, and the unlocking arm 13 is configured to drive the locking arm 12 to rotate around the rotating shaft 14 to achieve the unlocking function.

One end of the unlocking arm 13 is connected to a rotating sleeve, and the rotating sleeve is sleeved over the rotating shaft 14 in such a manner that the rotating sleeve is rotatably connected to the rotating shaft 14, so that the unlocking arm 13 can drive the rotating sleeve to rotate around the rotating shaft 14.

One end of the locking arm 12 is also fixedly connected to the outer wall of the rotating sleeve, so that the locking arm 12 is driven to rotate around the rotating shaft 14 when the unlocking arm 13 drives the rotating sleeve to rotate around the rotating shaft 14.

When unlocking is required, the unlocking arm 13 rotates counterclockwise around the rotating shaft 14 to drive the locking arm 12 to also rotate counterclockwise, so that the locking arm 12 can be separated from the inner side wall of the clamping groove 2 and enter the receiving cavity 9, whereby the quick release plate 1 can be slid out of the sliding groove 16.

In an optional embodiment, the unlocking structure further includes an unlocking slider 6. Both the unlocking arm 13 and the unlocking slider 6 are provided in the receiving cavity 9, the receiving cavity 9 is provided with an unlocking hole communicating with the outside, and the unlocking slider 6 is provided corresponding to the unlocking hole. One end of the unlocking arm 13 remote from the locking arm 12 abuts against an end portion of the unlocking slider 6.

In this embodiment, the unlocking arm 13 can be driven by the unlocking slider 6 to rotate around the rotating shaft 14, so that the length of the unlocking arm 13 can be reduced, thereby reducing the maximum swing range of the unlocking arm 13 and accordingly reducing the size of the entire base 4.

Specifically, in this embodiment, when the unlocking slider 6 moves from the right side to the left side as shown in FIGS. 4 to 12, the unlocking arm 13 can be driven to rotate counterclockwise to drive the locking arm 12 to rotate counterclockwise so as to enable unlocking of the quick release plate 1. In an optional embodiment, a transmission rod 10 is provided on the unlocking arm 13 close to the unlocking slider 6, the transmission rod 10 is rotatably connected to the unlocking arm 13, and a side wall of the transmission rod 10 abuts against an end portion of the unlocking slider 6.

In this embodiment, the transmission rod 10 is rotatably provided on the unlocking arm 13, so that when the unlocking slider 6 drives the unlocking arm 13 to rotate, the outer wall of the transmission rod 10 abuts against the unlocking slider 6 and thus autorotates following the sliding of the unlocking slider 6 and at the same time drives the unlocking arm 13 to rotate around the rotating shaft 14.

In other words, such an arrangement can reduce the friction between the unlocking slider 6 and the unlocking arm 13 and increase the service life of the unlocking arm 13 and the unlocking slider 6.

In an optional embodiment, the unlocking structure further includes a second elastic member 15. The second elastic member 15 is connected to the unlocking slider 6 and configured to apply, to the unlocking slider 6, a force in a direction away from the unlocking arm 13.

Specifically, the direction in which the unlocking slider 6 is away from the unlocking arm 13 is a direction from left to right in FIGS. 4 to 12.

Specifically, an unlocking push-button 8 is slidably provided in the unlocking hole, one end of the unlocking push-button 8 protrudes from the unlocking hole, and the unlocking push-button 8 is fixedly connected to the unlocking slider 6.

Figure 3:
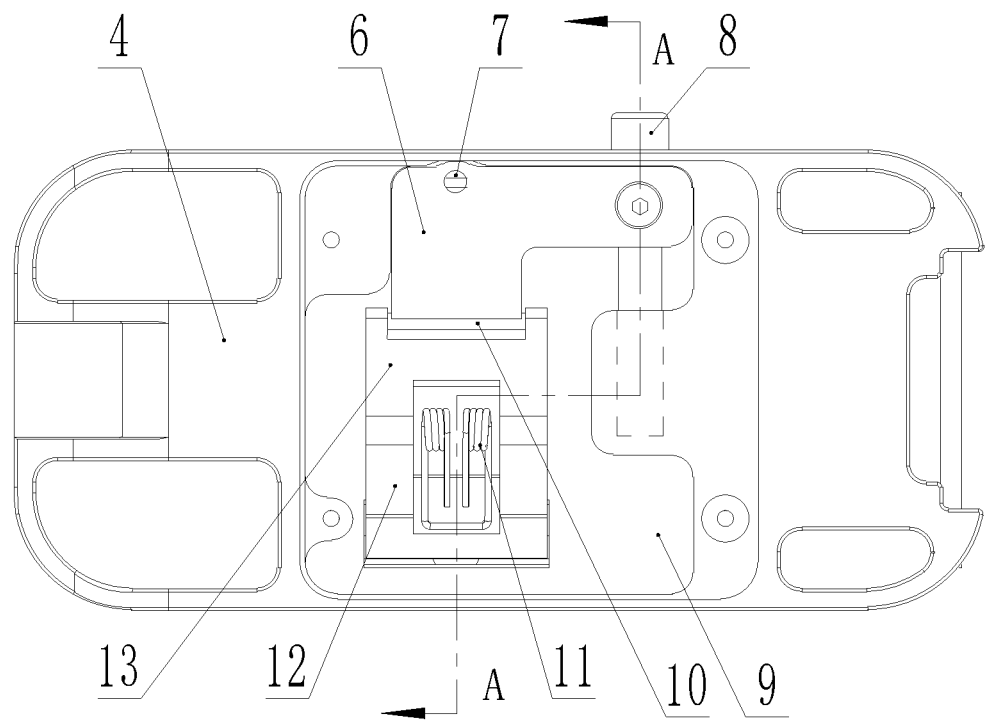
FIG. 3 is a top view of a base of a quick connection mechanism according to an embodiment of the present disclosure.

In this embodiment, the unlocking slider 6 has an L-shape as shown in FIG. 3, a part of which abuts against the transmission rod 10, and the other part of which is connected to the unlocking push-button 8, and a second elastic member 15 is provided at one end of the unlocking push-button 8. The unlocking push-button 8 can be restored to its original position by the second elastic member 15, so that the unlocking slider 6 can be restored to its original position to ensure sufficient space for the rotation of the locking arm 12, thereby ensuring normal locking of the quick release plate 1.

Specifically, in this embodiment, a blind hole is provided in the base 4, the blind hole communicates with the receiving cavity 9, and one end of the unlocking push-button 8 is inserted into the blind hole and connected to the second elastic member 15.

In this embodiment, the unlocking push-button 8 is of a rod-shaped structure which is slidable easily in the blind hole.

More specifically, in this embodiment, the second elastic member 15 is a compression spring, which has one end abutting against the bottom of the blind hole, and the other end abutting against one end of the unlocking push-button 8.

In this embodiment, the unlocking slider 6 may also be provided on the lower side as shown in FIG. 3. In this case, the unlocking of the locking arm 12 may be achieved by changing the position of the unlocking arm 13 or by some transmission structures.

Specifically, in this embodiment, the unlocking arm 13 may be provided at a side of the unlocking slider 6 away from the locking arm 12. In other words, the unlocking arm 13 is driven by the movement of the unlocking slider 6 to rotate in a direction away from the clamping groove 2 so as to drive the locking arm 12 to rotate in a direction away from the clamping groove 2 to achieve the unlocking of the locking arm 12.

Specifically, in this embodiment, the unlocking of the locking arm 12 may also be achieved by fitting of the unlocking slider 6 with a transmission structure.

More specifically, the transmission structure may be a rack-and-pinion structure. For example, a rack is provided on the unlocking slider 6, and a pinion is provided on the rotating shaft 14. Through driving of rack and pinion, the rotating shaft 14 is driven to rotate so as to drive the locking arm 12 to rotate, to achieve the unlocking function.

It should be noted that the transmission structure may be provided in many ways and may be in a rack and pinion form as described in this embodiment, but it is not limited to the rack and pinion structure, as long as it enables the movement of the unlocking slider 6 to drive the locking arm 12 to rotate so as to achieve the function of unlocking the quick release plate 1.

It should also be noted that, in this embodiment, the second elastic member 15 is a compression spring, but it is not limited to a compression spring, and it may be any other elastic structure, such as a tension spring, a torsion spring, a leaf spring, or the like, as long as it can give the unlocking push-button 8 a power for moving the unlocking push-button to the outside of the base 4.

It should also be noted that in this embodiment, the device for providing the power for moving the unlocking push-button 8 to the outside of the base 4 is an elastic member, but it may be any other component, such as an air cylinder, an oil cylinder, a magnetic device, or the like, as long as it can give the unlocking push-button 8 a power for moving the unlocking push-button always toward the outside of the base 4.

In an optional embodiment, a second limiting portion 7 is provided on the unlocking slider 6, and the second limiting portion 7 abuts against one end of the quick release plate 1 close to the groove bottom of the sliding groove 16.

In this embodiment, the second limiting portion 7 is configured to limit the movement of the quick release plate 1 in the upward/downward direction to ensure the stability of the quick release plate 1 in the sliding groove 16 and reduce a mounting clearance.

In an optional embodiment, one end of the second limiting portion 7 close to the quick release plate 1 is in the shape of a spherical cap smaller than a hemisphere.

Specifically, the upper end of the second limiting portion 7 is in the shape of a spherical cap and can be moved along with the unlocking slider 6 to abut against the quick release plate 1 with different strength, thereby ensuring the stability of the abutted quick release plate 1 and reducing a mounting clearance.

When in use, when the quick release plate 1 enters the sliding groove 16 from the right side as shown in the figure, the quick release plate can easily pass over the second limiting portion 7 and then abut against the locking arm 12.

After the locking arm 12 locks the quick release plate 1, the unlocking arm 13 and the second elastic member 15 cooperate to push the unlocking slider 6 rightward, so that the second limiting portion 7 is pushed rightward, whereby the second limiting portion 7 abuts against the lower side of the quick release plate 1 with increased strength, thereby increasing the stability of mounting of the quick release plate 1 and reducing a mounting clearance.

In an optional embodiment, an abutment surface 3 is provided at the inner edge of the groove opening of the clamping groove 2, and an included angle between the abutment surface 3 and a surface of the quick release plate 1 close to one side of the second limiting portion 7 is an acute angle.

Specifically, the acute angle is from 5° to 15°. The angle is designed to facilitate assembly. Preferably, the acute angle is 10°.

In other words, in this embodiment, a chamfer is provided at the inner edge of the groove opening of the clamping groove 2. Stable abutment between the second limiting portion 7 and the quick release plate 1 can be ensured by the chamfer.

In an optional embodiment, the second limiting portion 7 is detachably connected to the unlocking slider 6.

The detachable connection allows replacement of a different second limiting portion 7 for matching a different quick release plate 1, thereby ensuring mounting stability of the quick release plate 1 and reducing a mounting clearance.

Specifically, the detachable connection may be implemented in many ways and may for example be snap connection or threaded connection or the like, as long as the second limiting portion 7 and the unlocking slider 6 can be detachably connected to each other, and the stable connection between the second limiting portion 7 and the unlocking slider 6 can be ensured.

More specifically, in this embodiment, the height of the second limiting portion 7 protruding from the unlocking slider 6 is adjustable.

In other words, there is an adjustable distance between the spherical cap segment of the second limiting portion 7 and the unlocking slider 6, so that the requirements of use of different quick release plates 1 can be met even when the second limiting portion 7 is not replaced.

In this embodiment, the adjustment may be implemented in many ways.

Specifically, in this embodiment, the second limiting portion 7 includes a screw rod and a limiting spherical cap. The limiting spherical cap is provided at one end of the screw rod, and the unlocking slider 6 is provided with a threaded hole. The screw rod is fitted into the threaded hole. In this way, not only the height of the limiting spherical cap can be adjusted, but also the second limiting portion 7 can be fixedly positioned.

It should be noted that the height of the second limiting portion 7 protruding from the unlocking slider 6 may be adjusted in the above-mentioned manner, but is not limited to being adjusted in the above-mentioned manner, and may be adjusted in other manners, as long as the height of the second limiting portion 7 can be adjusted.

It can be seen from the above description that in the quick connection mechanism in the present disclosure, the quick release plate 1 may be fixed to a camera by screw and thread connection. This mechanism achieves the function of fixing the camera by fixing the quick release plate 1. The base 4 includes a main body and a bottom plate. The bottom plate is fixed to the main body by screws. The locking arm 12 is hinged to the bottom plate by means of the rotating shaft 14. A torsion spring is provided on the rotating shaft 14 to force the locking arm 12 to rotate clockwise. A transmission rod 10 is provided at the rear end of the unlocking arm 13. The transmission rod 10 is slidable along the inclined surface of the unlocking slider 6. The unlocking push-button 8 and the unlocking slider 6 are fixed by a screw. The main body is provided with a blind hole (i.e., an unlocking hole). The unlocking push-button 8 is slidable along the blind hole. A spring is provided inside the blind hole to force the unlocking push-button 8 to move upward. The second limiting portion 7 is fixed to the unlocking slider 6 by means of outer threads and moves along with the unlocking slider 6.

In the foregoing several embodiments, the unlocking push-button 8 is located on the base 4 and located on a side surface where the quick release plate 1 slides into the sliding groove 16.

The present disclosure further provides another embodiment. As shown in FIGS. 13 to 16, the unlocking push-button 8 is provided on two sides of a direction of the quick release plate 1 sliding in or sliding out. The details are described as follows.

In this embodiment, the unlocking push-button 8 is fixed to a push-button lever 18 by means of a push-button screw 21. The push-button lever 18 is slidable in the base 4. The inner end of the push-button lever 18 is connected to a translational slider 17 by means of a fixing screw 19. The unlocking slider 6 is rotatably connected to the unlocking arm 13 by means of a connecting shaft 20, and the unlocking slider 6 and the translational slider 17 have inclined surfaces fitted with each other.

When the unlocking push-button 8 is pushed to move axially toward the inside of the base, the unlocking push-button 8 drives the push-button rod 18 and then drives the translational slider 17 to move in the same direction. The unlocking slider 6 is driven by the action of the inclined surface of the translational slider 17 to move upward. When the unlocking slider 6 is moving upward, the unlocking arm 13 to rotate through the connecting shaft 20 around the rotating shaft 14 and then drives the locking arm 12 to rotate downwards to complete the unlocking action.

Figure 5:
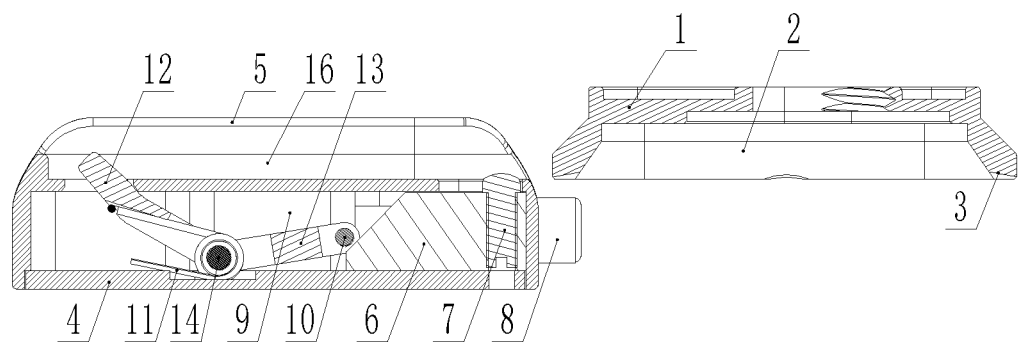
FIGS. 5 to 8 are schematic diagrams showing a process of connection of a quick connection mechanism according to an embodiment of the present disclosure.
Figure 6:
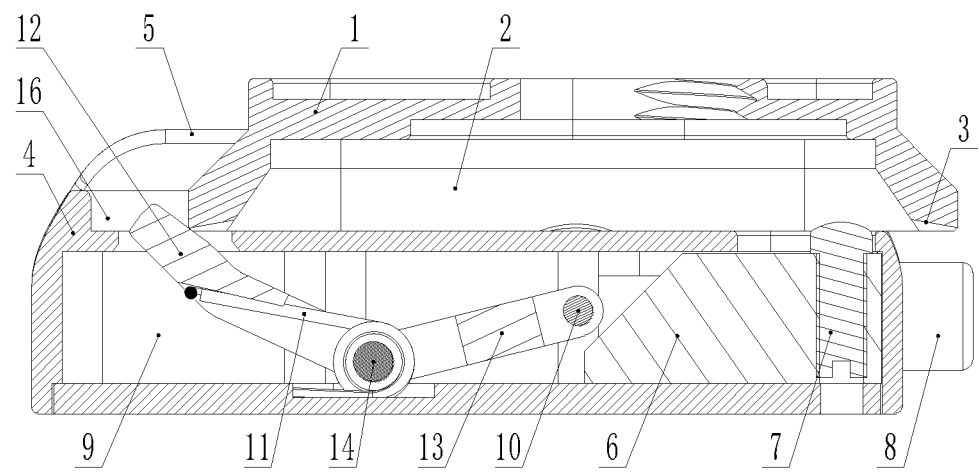
Figure 7:
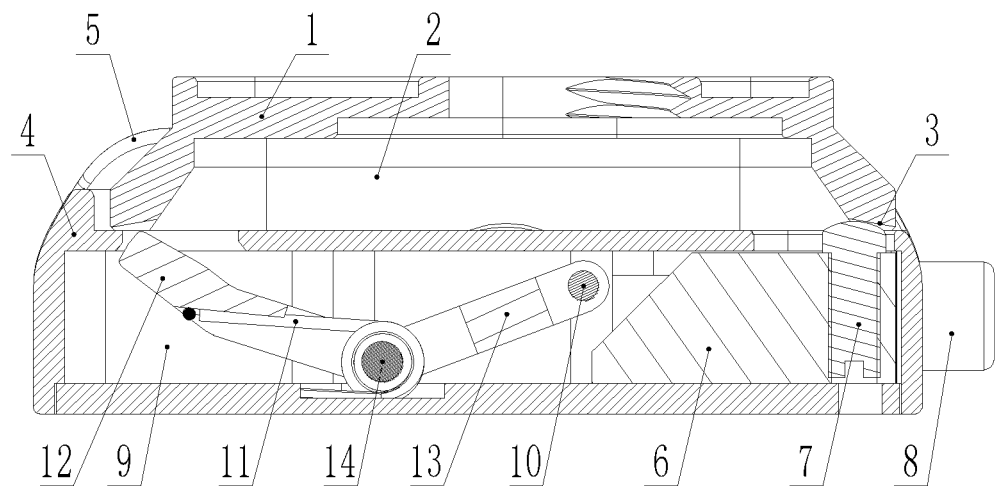
Figure 8:
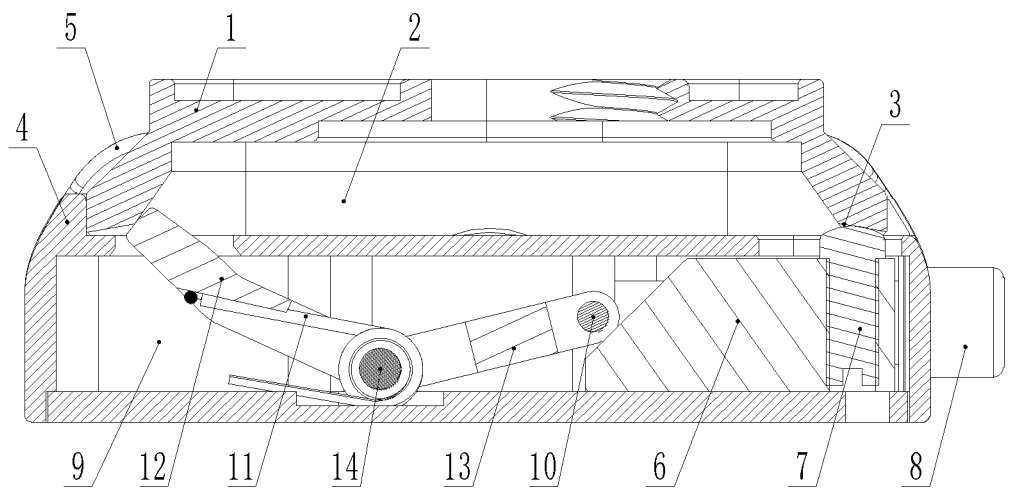

A process of quickly fixing the quick release plate is described as follows. As shown in FIG. 5, before the quick release plate is mounted, the locking arm is made to abut against the main body by the elastic force of the torsion spring. As shown in FIG. 6, the quick release plate is started to be inserted and touches the locking arm, and the locking arm is forced to rotate counterclockwise around the rotating shaft. As shown in FIG. 7, the quick release plate continues to enter, the locking arm is completely pressed by the bottom surface of the quick release plate, and the quick release plate starts to press the second limiting portion to drive the unlocking slider and the unlocking push-button to slide leftward together. As shown in FIG. 8, the quick release plate completely enters, the locking arm resiliently abuts against the inner side wall of the clamping groove, the second limiting portion abuts against the abutment surface, and the first limiting portions provided on the main body limit the quick release plate in the upward/downward direction, whereby the quick release plate is completely fixed.

Figure 9:
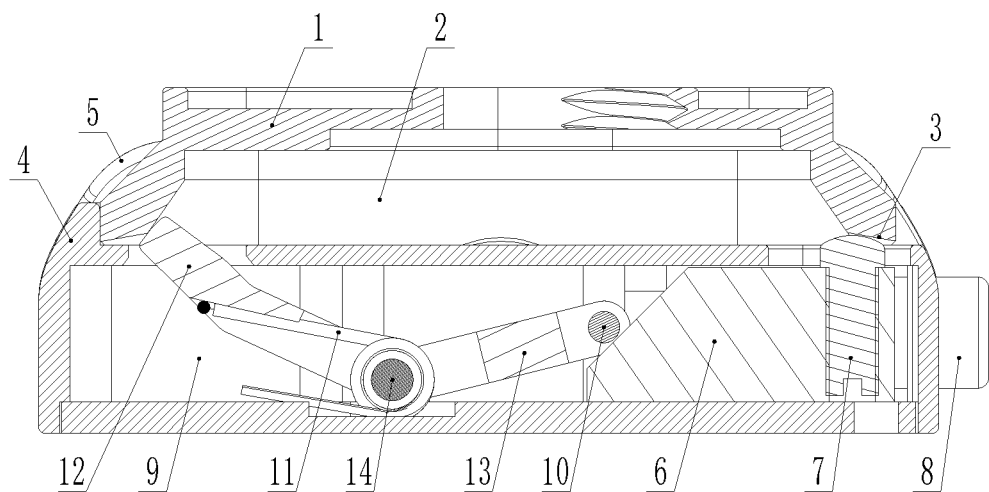
FIGS. 9 to 11 are schematic diagrams showing a process of disassembly of a quick connection mechanism according to an embodiment of the present disclosure.
Figure 10:
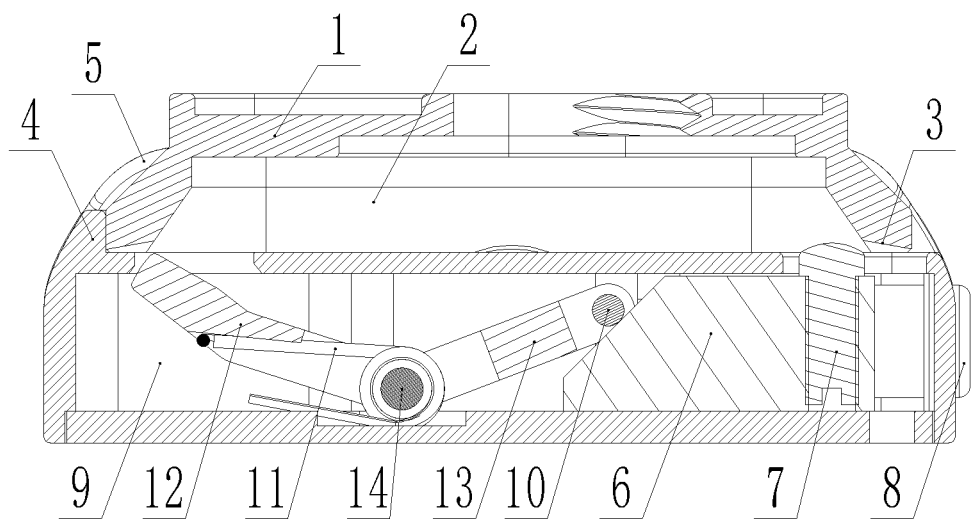
Figure 11:
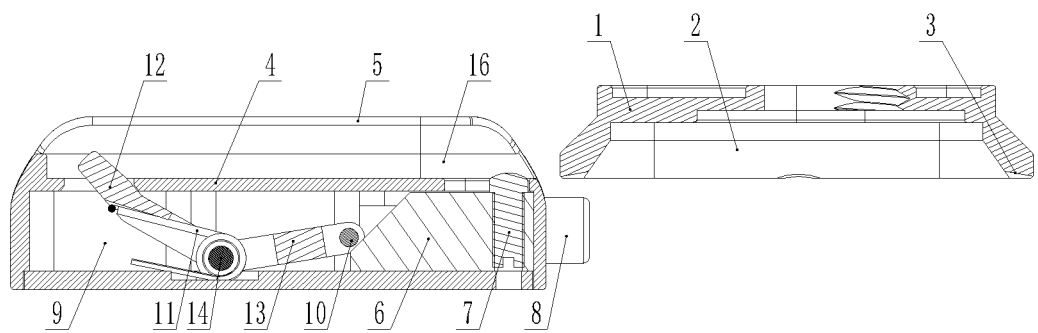

A process of quickly removing the quick release plate is described as follows. As shown in FIG. 9, the quick release plate is in the completely fixed state. As shown in FIG. 10, the unlocking push-button is pressed to drive the unlocking slider and the second limiting portion to move leftward. The unlocking slider moves leftward to press the transmission rod on the locking arm, and the transmission rod slides upward along the inclined surface of the unlocking slider, so that the unlocking arm drives the locking arm to rotate counterclockwise around the rotating shaft, the locking arm is separated from the inner side wall of the clamping groove, and the second limiting portion is separated from the abutment surface. At this time, the quick release plate can be removed freely. As shown in FIG. 11, the unlocking push-button and the locking arm are restored to their original positions.

Figure 12:
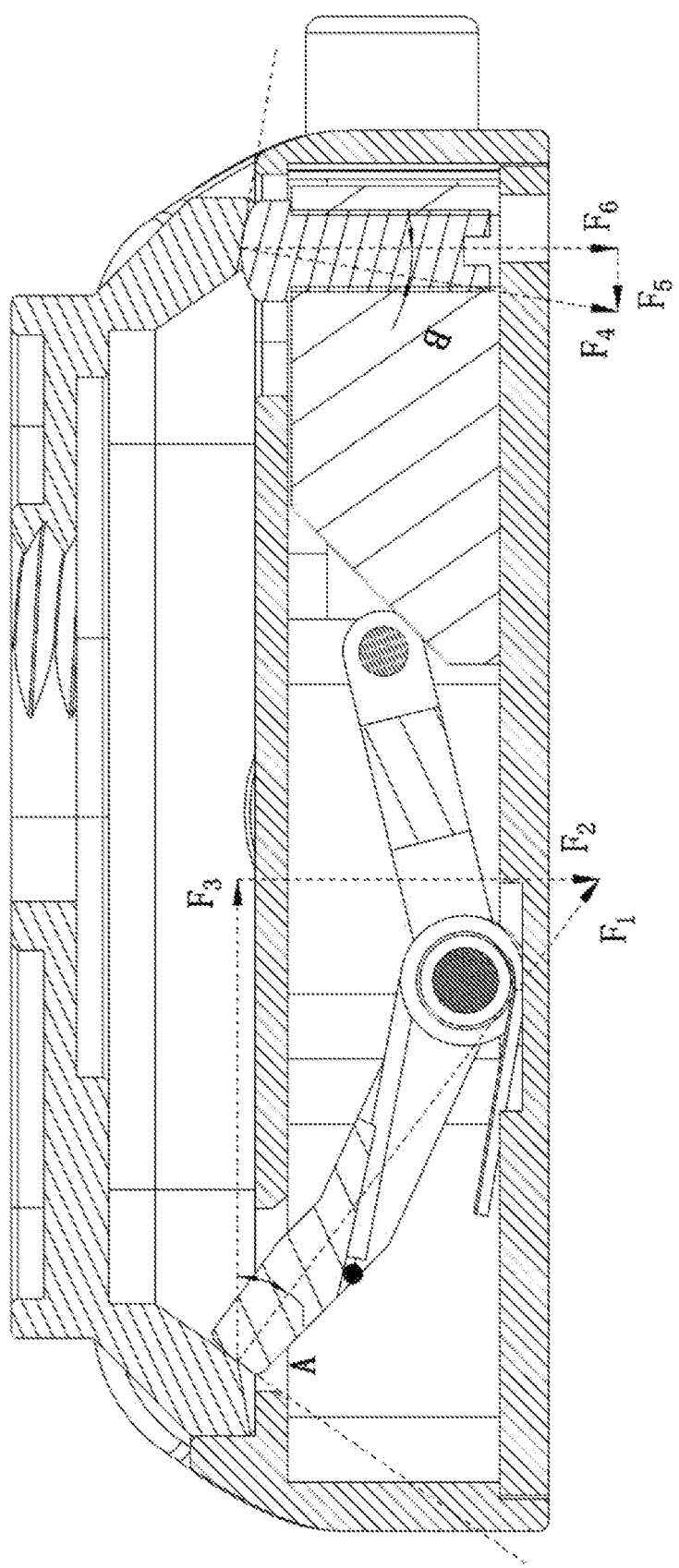
FIG. 12 is a force analysis diagram of a quick connection mechanism according to an embodiment of the present disclosure.
Figure 13:
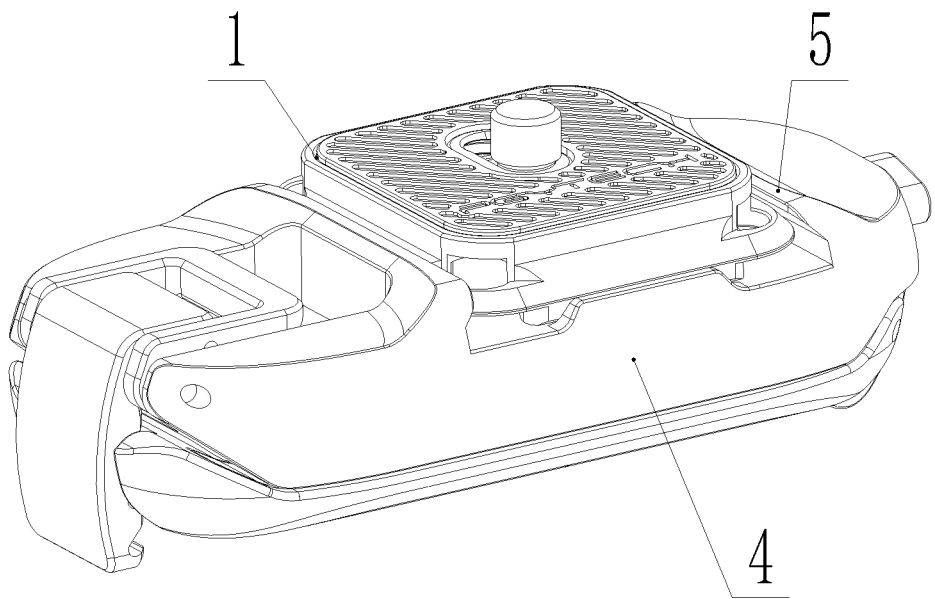
FIG. 13 is a schematic perspective structural diagram of another implementation of a quick connection mechanism according to an embodiment of the present disclosure.
Figure 14:
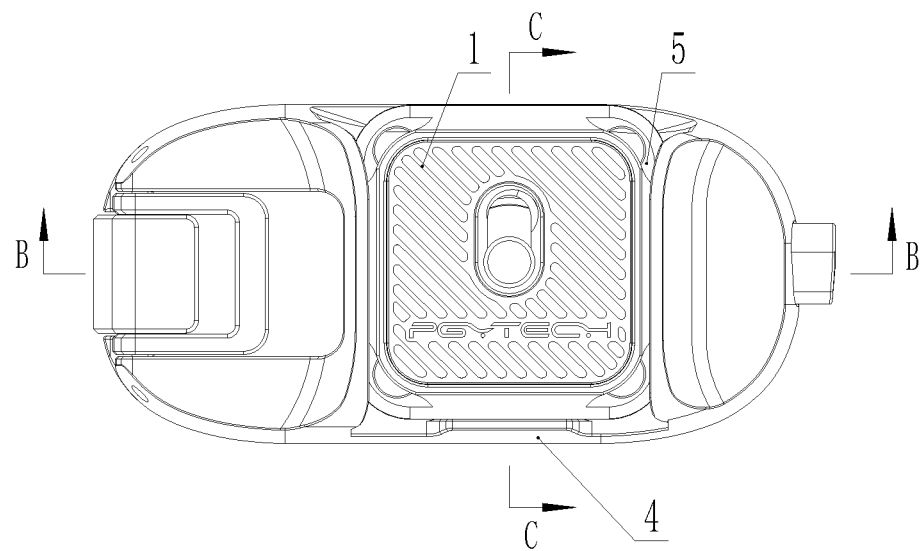
FIG. 14 is a front view of the structure of the implementation shown in FIG. 13.
Figure 15:
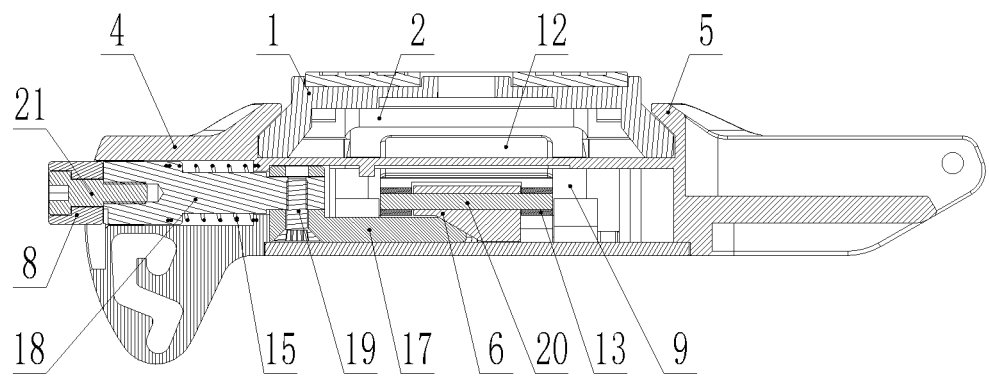
FIG. 15 is a sectional view taken along B-B of FIG. 14.
Figure 16:
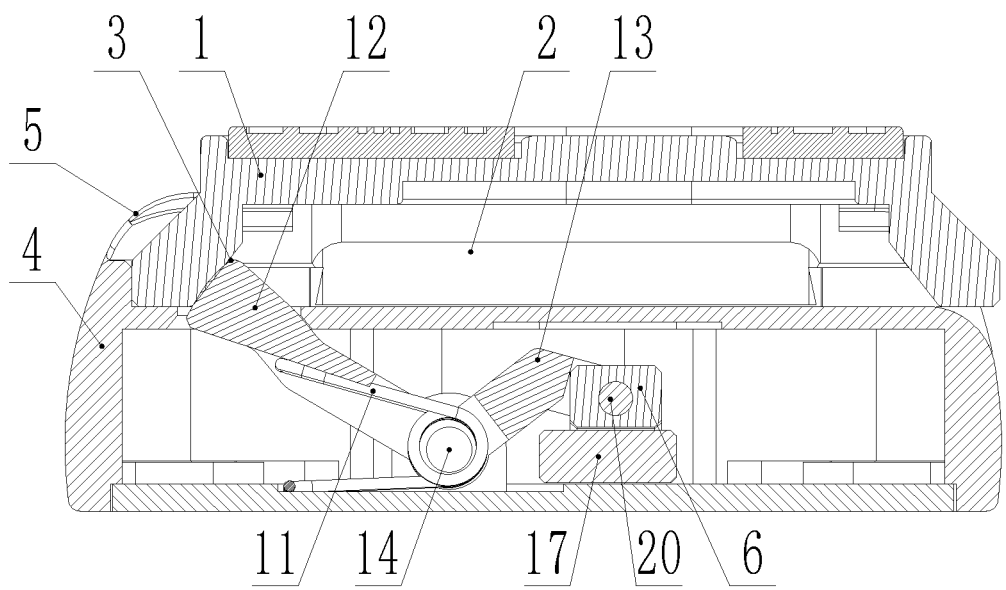
FIG. 16 is a sectional view taken along C-C of FIG. 14.

FIG. 12 shows a force analysis in the state where the quick release plate is fixed.

A resultant force $F_1$ exerted on the inner side wall of the clamping groove may be decomposed into $F_2$ and $F_3$. It can be concluded from the force analysis that the locking arm will not be disengaged from the inclined surface when $F_3$ is greater than $F_2$, namely, when $\angle A$ is less than 45°.

A resultant force $F_4$ exerted on the abutment surface may be decomposed into $F_5$ and $F_6$. It can be concluded from the force analysis that the static friction force $F_{static}=F_6 \times \mu$ when the coefficient of friction between the unlocking slider and the bottom plate is $\mu$. When $\mu=1$, $F_{static}=F_6$. It can be concluded from the force analysis that the unlocking slider will not slide leftward when $F_{static}$ is greater than $F_5$, namely, when $\angle B$ is less than 45°.

The embodiments of the present disclosure have the following advantageous effects.

After the quick release plate 1 slides into the sliding groove from one end of the sliding groove 16, the locking arm 12 is made to rotate on the rotating shaft 14. When the quick release plate 1 continues to slide in the sliding groove 16, the locking arm 12 rebounds, under the action of the first elastic member 11, into the clamping groove 2 of the quick release plate 1 and abut against the groove wall of the clamping groove 2, so that the quick release plate 1 cannot slide in the sliding groove 16 in the reverse direction, thereby enabling quick assembling of the quick release plate 1 onto the base 4 and ensuring stability between the quick release plate 1 and the base 4.

The above description is merely illustrative of preferred embodiments of the present disclosure and is not intended to limit the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

INDUSTRIAL APPLICABILITY

In summary, the present disclosure provides a quick connection mechanism with a simple structure and high stability.

What is claimed is:

1. A quick connection mechanism, comprising a quick release plate, a base, and a locking structure,
    wherein the quick release plate is in a shape of a truncated cone, a clamping groove is provided in a bottom surface of the quick release plate with the bottom surface having a larger area, and the clamping groove is a tapered groove;
    a sliding groove is provided in the base, and the quick release plate is clamped in the sliding groove;
    the locking structure is configured to fix the quick release plate that enters the sliding groove;
    the locking structure comprises a locking arm, a rotating shaft, and a first elastic member;
    the locking arm is rotatably provided on the rotating shaft, and one end of the locking arm abuts against an inner side wall of the clamping groove and is configured to enable locking of the quick release plate in the sliding groove by the abutment; and
    the first elastic member is connected to the locking arm, and the first elastic member is configured to apply, to the locking arm, a force in a direction for locking the quick release plate.

2. The quick connection mechanism according to claim 1, wherein the sliding groove provided in the base is a half-through groove, and the sliding groove is configured for allowing the quick release plate to enter the sliding groove from one end of the base and slide in a length direction of the sliding groove and to be blocked by a side wall of the sliding groove when sliding to the other end of the sliding groove, so as to not able to slide.

3. The quick connection mechanism according to claim 1, wherein the base is provided with a receiving cavity, the locking structure is provided in the receiving cavity, the rotating shaft is fixedly provided in the receiving cavity, and two ends of the rotating shaft are provided on two opposite side walls of the receiving cavity.

4. The quick connection mechanism according to claim 1, wherein the base is provided with first limiting portions, and the first limiting portions are provided in front of a direction of sliding into the sliding groove and on two sides of a direction of sliding in the sliding groove.

5. The quick connection mechanism according to claim 1, wherein the base is provided with an unlocking structure, and the unlocking structure is configured to unlock the locking structure.

6. The quick connection mechanism according to claim 5, wherein the unlocking structure comprises an unlocking arm;
  the unlocking arm is connected to the locking arm, and the unlocking arm is configured to drive the locking arm to rotate around the rotating shaft to achieve an unlocking function.

7. The quick connection mechanism according to claim 6, wherein the unlocking structure further comprises an unlocking slider;
  both the unlocking arm and the unlocking slider are provided in the base, the base is provided with an unlocking hole communicating with an outside, and the unlocking slider is provided corresponding to the unlocking hole; and
  one end of the unlocking arm remote from the locking arm abuts against an end portion of the unlocking slider.

8. The quick connection mechanism according to claim 7, wherein a transmission rod is provided on the unlocking arm close to the unlocking slider, the transmission rod is rotatably connected to the unlocking arm, and a side wall of the transmission rod abuts against the end portion of the unlocking slider.

9. The quick connection mechanism according to claim 7, wherein the unlocking structure further comprises a second elastic member, and the second elastic member is connected to the unlocking slider and configured to apply, to the unlocking slider, a force in a direction away from the unlocking arm.

10. The quick connection mechanism according to claim 7, wherein a second limiting portion is provided on the unlocking slider, and the second limiting portion abuts against one end of the quick release plate close to a groove bottom of the sliding groove.

11. The quick connection mechanism according to claim 10, wherein one end of the second limiting portion close to the quick release plate is in a shape of a spherical cap smaller than a hemisphere.

12. The quick connection mechanism according to claim 10, wherein an abutment surface is provided at an inner edge of a groove opening of the clamping groove, and an included angle between the abutment surface and a surface of the quick release plate close to one side of the second limiting portion is an acute angle.

13. The quick connection mechanism according to claim 12, wherein the acute angle is from 5° to 15°.

14. The quick connection mechanism according to claim 12, wherein the second limiting portion is detachably connected to the unlocking slider; and/or
  a height of the second limiting portion protruding from the unlocking slider is adjustable.

15. The quick connection mechanism according to claim 14, wherein the detachable connection is snap connection or threaded connection.

16. The quick connection mechanism according to claim 7, wherein an unlocking push-button is slidably provided in the unlocking hole, one end of the unlocking push-button protrudes from the unlocking hole, and the unlocking push-button is fixedly connected to the unlocking slider.

17. The quick connection mechanism according to claim 2, wherein the base is provided with a receiving cavity, the locking structure is provided in the receiving cavity, the rotating shaft is fixedly provided in the receiving cavity, and two ends of the rotating shaft are provided on two opposite side walls of the receiving cavity.

18. The quick connection mechanism according to claim 2, wherein the base is provided with first limiting portions, and the first limiting portions are provided in front of a direction of sliding into the sliding groove and on two sides of a direction of sliding in the sliding groove.

19. The quick connection mechanism according to claim 2, wherein the base is provided with an unlocking structure, and the unlocking structure is configured to unlock the locking structure.

20. The quick connection mechanism according to claim 3, wherein the base is provided with first limiting portions, and the first limiting portions are provided in front of a direction of sliding into the sliding groove and on two sides of a direction of sliding in the sliding groove.

* * * * *